United States Patent
Min et al.

(10) Patent No.: US 9,330,185 B2
(45) Date of Patent: May 3, 2016

(54) POI RELATED INFORMATION PROCESSING SYSTEM AND METHOD, AND APPARATUS FOR SUPPORTING THE SAME

(71) Applicant: SK Planet Co., Ltd., Seongnam-si, Gyeonggi-do (KR)

(72) Inventors: Kyungkoo Min, Seoul (KR); Junesup Lee, Yongin-si (KR); Joongyoung Noh, Seoul (KR)

(73) Assignee: SK PLANET CO., LTD., Seongnam-Si, Gyeonggi-Do (KR)

( * ) Notice: Subject to any disclaimer, the term of this patent is extended or adjusted under 35 U.S.C. 154(b) by 113 days.

(21) Appl. No.: 14/241,606

(22) PCT Filed: Aug. 8, 2013

(86) PCT No.: PCT/KR2013/007155
§ 371 (c)(1),
(2) Date: Feb. 27, 2014

(87) PCT Pub. No.: WO2014/058148
PCT Pub. Date: Apr. 17, 2014

(65) Prior Publication Data
US 2015/0339389 A1    Nov. 26, 2015

(30) Foreign Application Priority Data

Oct. 12, 2012   (KR) .......................... 10-2012-0113426

(51) Int. Cl.
| | |
|---|---|
| *G01S 1/00* | (2006.01) |
| *G06F 17/30* | (2006.01) |
| *H04L 29/08* | (2006.01) |
| *G06Q 30/02* | (2012.01) |
| *G06Q 50/10* | (2012.01) |

(52) U.S. Cl.
CPC .... *G06F 17/30867* (2013.01); *G06F 17/30312* (2013.01); *G06F 17/30424* (2013.01); *G06Q 30/0261* (2013.01); *G06Q 50/10* (2013.01); *H04L 67/18* (2013.01)

(58) Field of Classification Search
CPC ........................ G01C 21/3679; G06F 17/3087
USPC .................................................. 701/400, 533
See application file for complete search history.

(56) References Cited

U.S. PATENT DOCUMENTS

| | | | | | |
|---|---|---|---|---|---|
| 5,848,373 | A | * | 12/1998 | DeLorme ............... | G01C 21/20 340/990 |
| 6,321,158 | B1 | * | 11/2001 | DeLorme ............... | G01C 21/26 340/995.16 |

(Continued)

FOREIGN PATENT DOCUMENTS

| | | |
|---|---|---|
| JP | 2004355075 A | 12/2004 |
| KR | 1020060068111 A | 6/2006 |
| KR | 1020110024571 A | 3/2011 |

OTHER PUBLICATIONS

Written Opinion of the International Searching Authority dated Nov. 20, 2013, for PCT/KR2013/007155.

*Primary Examiner* — McDieunel Marc
(74) *Attorney, Agent, or Firm* — Hauptman Ham, LLP

(57) ABSTRACT

Provided are a point of interest (POI) related information processing system and method and an apparatus for supporting the same. The POI related information processing system includes at least one POI related information providing device that provides POI related information including specific business name information and at least a part of address information, and a POI related information processing device that creates a query based on business name information of at least one piece of specific POI information and at least a part of address information thereof, collects the POI related information associated with corresponding POI information based on a corresponding query from the at least one POI related information providing device, collects a predefined certain amount of the POI related information by performing at least one filtering in accordance with a predefined rule, and then stores and operates the collected information in conjunction with the POI information.

11 Claims, 3 Drawing Sheets

(56) References Cited

U.S. PATENT DOCUMENTS

| | | | |
|---|---|---|---|
| 2004/0249927 A1* | 12/2004 | Pezutti | H04L 41/065 709/223 |
| 2006/0287810 A1 | 12/2006 | Sadri et al. | |
| 2009/0070338 A1* | 3/2009 | Spitzig | G06Q 10/10 |
| 2010/0305842 A1 | 12/2010 | Feng | |

* cited by examiner

POI RELATED INFORMATION PROCESSING SYSTEM AND METHOD, AND APPARATUS FOR SUPPORTING THE SAME

CROSS REFERENCE TO RELATED APPLICATION

This application claims the priority of Korean Patent Application No. 10-2012-0113426, filed on Oct. 12, 2012 in the KIPO (Korean Intellectual Property Office). Further, this application is the National Phase application of International Application No. PCT/KR2013/007155 filed Aug. 8, 2013, which designates the United States and was published in Korean.

TECHNICAL FIELD

The present invention relates to collection and operation of information, and more particularly, to a point of interest (POI) related information processing system and method which may support POI related information to be effectively collected and classified, and an apparatus for supporting the same.

BACKGROUND ART

According to the recent development of the Internet, services such as blogs, Internet bulletin boards, and the like are activated, and various evaluations, opinions, ideas, and the like by a broad range of people ranging from light conversations about everyday private lives to serious discussions about politics and social issues are newly created and provided every moment. In addition, according to the development of the Internet, stories of blogs, cafes, and various bulletins are equally shared with existing mass media.

Due to characteristics of such Internet media, there are trends in which many users acquire information on restaurants, hotels, destinations, and the like through the Internet, and service providers strengthen promotion through the Internet. However, since Internet media are produced and distributed without restrictions on time and everyone creates and distributes information, high costs are caused due to too much time and efforts which are spent in collecting and analyzing a large amount of information related to specific service providers. Furthermore, when the number of stores to which data collection and analysis services should be provided increases, it is almost impossible for a person to directly perform corresponding tasks, and the processing speed is very slow. In particular, in order to effectively provide data in accordance with data analysis and filtering, it is difficult to have unity in that a person directly performs data collection and analysis, and therefore it is difficult for the collected and analyzed information to have consistency.

DISCLOSURE

Technical Problem

The present invention is directed to providing a point of interest (POI) related information processing system and method which may collect a large quantity of documents including POI related information on the web using a POI DB in which company names (or firm names, business names) are registered and filter the collected documents, and an apparatus for supporting the same.

The present invention is also directed to providing a POI related information processing system and method which may support to collect POI related information, to remove information which is not associated with the POI or unnecessary documents from the collected information, and to acquire filtered document groups, and an apparatus for supporting the same.

The present invention is also directed to a providing a POI related information processing system and method which may more rapidly collect and filter a large quantity of documents, and an apparatus for supporting the same.

Technical Solution

One aspect of the present invention provides a point of interest (POI) related information processing system including: at least one POI related information providing device that provides POI related information including specific business name information and at least a part of address information; and a POI related information processing device that creates a query based on business name information of at least one piece of specific POI information and at least a part of address information thereof, collects the POI related information associated with corresponding POI information based on a corresponding query from the at least one POI related information providing device, collects a predefined certain amount of the POI related information by performing at least one filtering in accordance with a predefined rule, and then stores and operates the collected information in conjunction with the POI information.

Another aspect of the present invention provides a POI related information processing device including: a device communication unit that forms a communication channel for collecting POI related information through a communication network; and a device control unit that supports to create a query based on business name information of at least one piece of specific POI information and at least a part of address information thereof, collect POI related information associated with corresponding POI information based on a corresponding query, and collect a predefined certain amount of the POI related information by performing at least one filtering in accordance with a predefined rule.

Here, the POI related information processing device may further include a device storage unit that stores the POI information and the POI related information stored in conjunction with the POI information.

Meanwhile, the device control unit may include a collection module that includes a plurality of information collectors for collecting the POI related information based on the query, a filter that performs filtering on the POI related information collected by the collection module in accordance with a predefined rule, and a parser that divides and classifies the POI related information transmitted from the collection module into a title and a body.

Here, the filter may perform at least one of address information based filtering for performing filtering on the POI related information based on the address information in accordance with the predefined rule, phone number based filtering for performing filtering on the POI related information by excluding information including a predefined phone number, image information based filtering for performing filtering in accordance with whether image information is included in the POI related information, and title based filtering for performing filtering in accordance with whether predefined certain information of a title and a body of the POI related information is included in the title.

In addition, the device control unit may adjust the number of documents collected by the collection module to be the number of documents to be secured for each POI by performing the at least one filtering on the number of documents collected by the collection module. Here, the device control unit may omit a part of the at least one filtering when the number of documents collected by the collection module is smaller than the number of documents to be secured for each POI. In addition, the device control unit may adjust the number of documents collected by the collection module to be the number of documents to be secured for each POI by complexly performing the at least one filtering when the number of documents collected by the collection module is larger than the number of documents to be secured for each POI.

Meanwhile, the device control unit may create at least one query based on the business name information of the POI and -si, -gun, and -dong information of the at least a part of the address information, and allocate the created query to the collection module.

Still another aspect of the present invention provides a POI related information processing method including: creating a query based on at least a part of business name information and address information from POI information; collecting POI related information including the created query from a content providing device; performing at least one filtering for collecting the POI related information by performing filtering on the collected POI related information in accordance with a predefined rule; and storing the filtered POI related information in conjunction with the POI information.

Here, the performing of the at least one filtering may include performing address information based filtering on the POI related information based on address information in accordance with a predefined rule, performing phone number based filtering on the POI related information by excluding information including a predefined phone number, performing image information based filtering in accordance with whether image information is included in the POI related information, and performing title based filtering in accordance with whether predefined certain information of a title and a body of the POI related information is included in the title.

The POI related information processing method may further include adjusting the number of documents to be secured for each POI by performing the at least one filtering on the number of documents collected by the collection module. Here, the adjusting may include omitting at least a part of the performing of the at least one filtering when the number of documents collected by the collection module is smaller than the number of documents to be secured for each POI, and adjusting the number of documents collected by the collection module to be the number of documents to be secured for each POI by complexly performing the at least one filtering when the number of documents collected by the collection module is larger than the number of documents to be secured for each POI.

Yet another aspect of the present invention provides a computer readable recording medium in which a program for executing the above-described method is recorded.

Advantageous Effects

As described above, according to the POI related information processing system and method and the apparatus for supporting the same according to the present invention, it is possible to more rapidly and reliably provide POI related information highly associated with specific POI information.

MODES OF THE INVENTION

Figure 1:
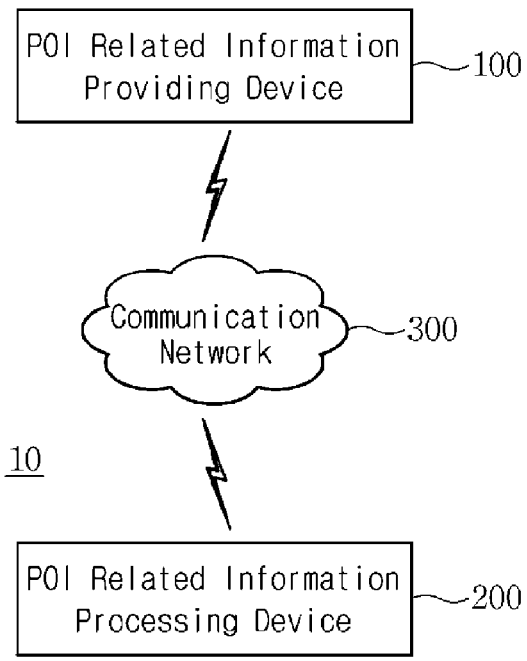
FIG. 1 is a schematic view showing a configuration a point of interest (POI) related information processing system according to an embodiment of the present invention.

Hereinafter, exemplary embodiments of the present invention will be described in detail.

However, the present invention is not limited to the exemplary embodiments disclosed below, but can be implemented in various forms. The following exemplary embodiments are described in order to enable those of ordinary skill in the art to embody and practice the invention.

When it is determined that the detailed description of known art related to the present invention may obscure the gist of the present invention, the detailed description thereof will be omitted. The same reference numerals are used to refer to the same element throughout the specification. The relative size and depiction of these elements may be exaggerated for clarity, illustration, and convenience.

FIG. 1 is a schematic view showing a configuration a point of interest (POI) related information processing system 10 according to an embodiment of the present invention.

Referring to FIG. 1, the POI related information processing system 10 may include a plurality of POI related information providing devices 100 and a POI related information processing device 200, and further include a communication network 300 including various types of network devices for supporting communication connection between the POI related information providing device 100 and the POI related information processing device 200.

The POI related information processing system 10 according to an embodiment of the present invention having the above-described configuration supports to collect POI related information from web documents included in the plurality of POI related information providing devices 100, perform parsing certain information in accordance with a predefined rule from the collected POI related information, and perform filtering on the parsed information using predefined certain conditions to collect the POI related information. The POI related information collected in this manner is stored in conjunction with stored POI information, and therefore the POI related information processing system 10 according to an embodiment of the present invention may support to collect and provide effective information associated with specific POI.

The POI related information providing device 100 is a device that posts POI related information including specific information associated with at least one POI, for example, business name and address information through the communication network 300. Here, the POI related information may be specific documents included in web pages or web documents which are provided by the POI related information providing device 100. In particular, the POI related information may be documents including POI business name, address information, phone number information, and image information associated with a corresponding POI. The POI related information providing device 100 may provide the above-described POI related information to a certain web document or page by a corresponding device manager. The image information included in the POI related information may include URL link information. The above-described POI related information providing devices 100 may be devices that operate blogs, web sites, Internet bulletin boards, data libraries, and the like which provide the POI related information. A single POI related information providing device 100 may provide a plurality of pieces of POI related information, and the plurality of POI related information providing devices 100 may provide the same POI related information. The above-described POI related information providing device 100 may access the communication network 300 to give an access authority to authenticated user terminals, thereby providing the above-described POI related information or providing the POI related information in response to a request of a connected user terminal without separate authentication.

The POI related information processing device 200 accesses at least one POI related information providing device 100 which accesses the communication network 300, and collects the POI related information from a corresponding device. Next, the POI related information processing device 200 may support to extract only the POI related information which is determined to have validity designated by an information manager or provide effectiveness to a user, by performing filtering on the collected POI related information in accordance with a predefined rule. For this, the POI related information processing device 200 has a limitation in searching for the POI related information using a predefined query in a process of detecting a large amount of POI related information, and has a limitation in the number of pieces of the POI related information so that the number of pieces of the searched POI related information is a certain number. In addition, the POI related information processing device 200 may perform filtering on the information whose number of pieces is limited as the certain number based on predefined certain conditions in order to inspect validity or effectiveness of the information, and the filtered POI related information may be stored in conjunction with each POI item of a POI database including a business name. Through the above-described process, the POI related information processing device 200 according to an embodiment of the present invention may support to provide information which has high relevance to POI and has high validity and effectiveness to a terminal requesting corresponding information. More detailed configuration and components of the POI related information processing device 200 will be described with reference to drawings.

The communication network 300 may support to form a communication channel for data transmission and signal transmission between the respective components of the POI related information processing system 10. That is, the communication network 300 may form the communication channel of the POI related information providing device 100 and the POI related information processing device 200, and support data transmission and reception between the POI related information providing device 100 and the POI related information processing device 200. For example, the communication network 300 may form the communication channel for POI related information collection of information collectors included in the POI related information processing device 200, and support POI related information transmission from the POI related information providing device 100 to the POI related information processing device 200. The communication network 300 is not limited to a communication network that supports a specific communication method, and may include various types of communication networks enabling information transmission and reception between the POI related information processing device 200 and the POI related information providing device 100. For example, the communication network 300 may include various network devices that constitute an Internet network for the purpose of the use of communication services by the POI related information providing devices 100 and the POI related information processing device 200.

When the POI related information processing system 10 according to an embodiment of the present invention provides the POI related information to various network connection devices through the communication network 300, the POI related information processing device 200 supports to collect the POI related information and process the collected POI related information into highly effective data by performing parsing and filtering on the collected POI related information in accordance with predefined rules. Next, the POI related information processing system 10 stores and manages corresponding data in conjunction with POI information and provides the stored and managed data in accordance with a request of a user, thereby supporting the user to easily search for more reliable data and data highly associated with POI. Thus, according to the present invention, it is possible to support a user to more rapidly or accurately search for required information, and the POI related information providing device 100 may process a large amount of data into highly effective data, thereby supporting to create a new value.

Figure 2:
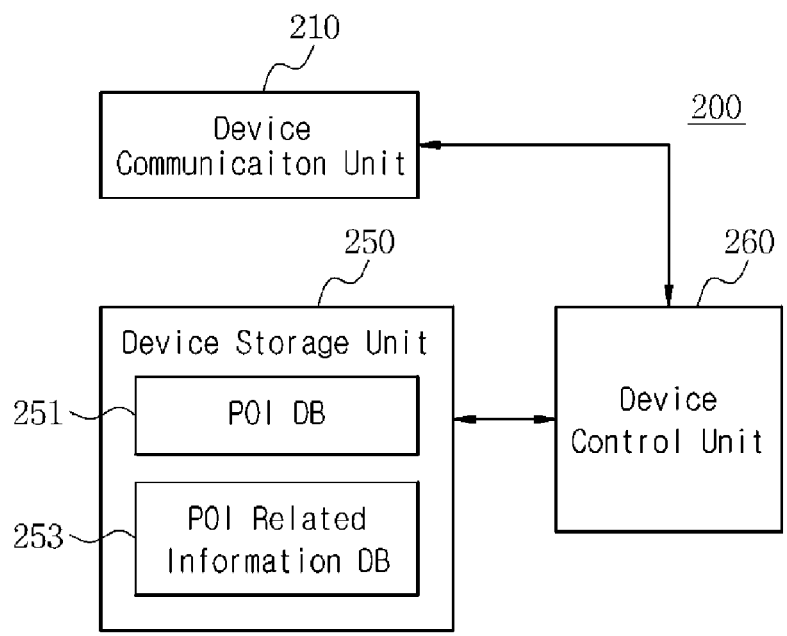
FIG. 2 is a view showing a configuration of the POI related information processing system of FIG. 1 in more detail.

FIG. 2 is a view showing a configuration of the POI related information processing device 200 according to an embodiment of the present invention in more detail.

Referring to FIG. 2, the POI related information processing device 200 according to an embodiment of the present invention may include a device communication unit 210, a device storage unit 250, and a device control unit 260.

The device communication unit 210 supports a communication function of the POI related information processing device 200. That is, the device communication unit 210 may form a communication channel with the communication network 300 in accordance with control of the device control unit 260 and may be allocated with a certain address to perform a communication service operation. For example, the device communication unit 210 may form communication channels with the plurality of POI related information providing devices 100 in order to collect the POI related information, and support the POI related information searched by the information collectors of the POI related information processing device 200 to be transmitted to the POI related information providing device 100 through the communication network 300. Next, the device communication unit 210 may support the POI related information searched by corresponding information collectors to be received from the corresponding information collectors. The received POI related information may be provided to the device control unit 260 to be subjected to certain processing, and then converted into highly effective and reliable POI related information to be stored in the device storage unit 250.

Meanwhile, the device communication unit 210 may receive a POI database including a business name from another terminal in advance in order to collect the POI related information. Each piece of POI information of the received POI database may be used as seed information in collecting and extracting the POI related information. In addition, the device communication unit 210 may support to form a communication channel for connection of user terminals requesting POI related information search, and support to provide, when receiving specific POI information as a search word from the corresponding user terminals, POI related information corresponding to the received POI information to a corresponding user terminal. In this instance, the device communication unit 210 may support transmission and reception of authenticated information in accordance with a policy of the POI related information processing device 200.

The device storage unit 250 stores various programs and data for operation of the POI related information processing device 200. In particular, the device storage unit 250 may store a POI database 251 and POI related information 253 for collection and operation of the POI related information.

The POI database 251 stores POI information including business names. Such a POI database 251 may store the POI information in accordance with a predefined POI format. The POI format may include formats including items such as "business classification category," "key ID," "POI name," "POI name 2," "address," and "phone number". Such a POI format may be input directly by a manager of the POI related information processing device 200 or received from another terminal. The device control unit 260 may determine whether the POI database 251 is configured in the above-described format when receiving the POI database 251 from another terminal. Next, the device control unit 260 may re-configure the POI database 251 in the form of the above-described POI format when a format of the POI database 251 received from the other terminal is different from the above-described format. For example, the above-described format may be applied in the following form.

EXAMPLES

Ex1) [cafe/dissert], [4503810], [00cafe], [Busan OO store], [OO-dong, Saha-gu, Busan], [051-000-0000]

Ex2) [Korean food], [1242924], [OO-gwan], [main store], [OO-dong, Jung-gu, Seoul], [02-000-0000]

That is, the POI database 251 may include a large number of pieces of POI information having the above-described POI format. The POI information included in the POI database 251 may be used as seed information of collection of the POI related information which is collected to detect the POI related information. In particular, some information of the POI information, for example, business name information and address information or business name information and POI name information may be used for collecting the POI related information.

The POI related information 253 is information obtained by performing filtering on the POI related information collected from the POI related information providing device 100 in accordance with predefined certain rules and conditions which are set in the device control unit 260. Such POI related information 253 may be stored in conjunction with each piece of POI information stored in the POI database 251.

The device control unit 260 controls signal processing, data transmission, and data processing which are required for supporting collection, storage, and operation of the POI related information 253. For example, the device control unit 260 sequentially calls the POI information stored in the POI database 251, and controls to collect the POI related information 253 corresponding to the called POI information. Alternatively, when specific POI information requested by a specific user terminal connected through the device communication unit 210, that is, a search word including a business name and an address is input, the device control unit 260 detects POI information equivalent to corresponding information from the POI database 251, and performs detection of POI related information using the detected POI information as seed information. A time point of collection of the POI related information 253 may differ in accordance with a design policy of the POI related information processing device 200 of the present invention. For example, the device control unit 260 may perform collection or updating of the POI related information 253 with respect to all of the POI information included in the POI database 251 at predefined certain intervals, and as described above, may also perform collection or updating of the POI related information 253 when requests for the POI related information 253 associated with specific POI information occur. Alternatively, the device control unit 260 may collect and store the POI related information 253 at a time point when initial POI information is stored in the device storage unit 250, and then control to update the corresponding POI related information 253 at certain intervals or when a specific request occurs.

Figure 3:
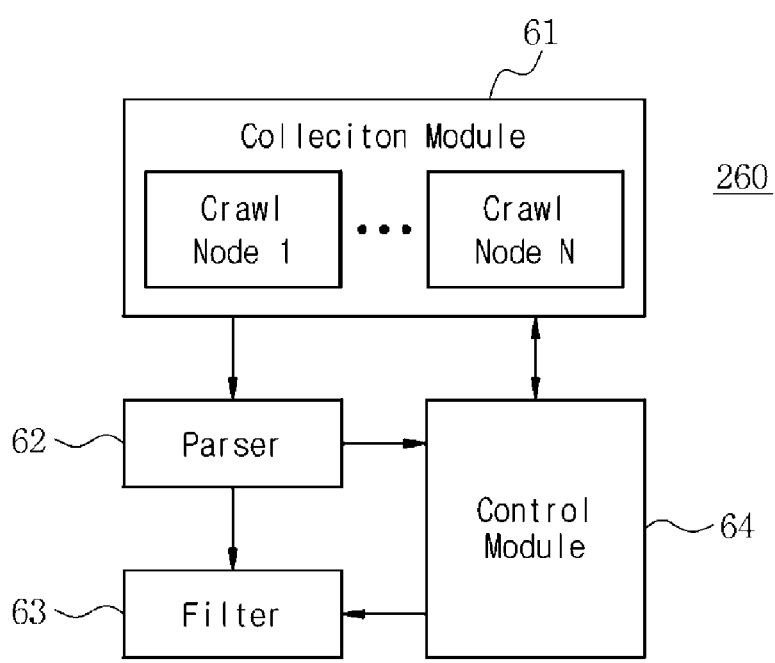
FIG. 3 is a block diagram showing a configuration of a device control unit of FIG. 2 in more detail.

The above-described device control unit 260 may include a configuration shown in FIG. 3 in order to collect, store, and operate the POI related information 253 according to an embodiment of the present invention.

FIG. 3 is a view showing a configuration of the device control unit 260 among components of the POI related information processing device 200 according to an embodiment of the present invention.

Referring to FIG. 3, the device control unit 260 of the present invention may include a collection module 61 including a plurality of information collectors, a parser 62, a filter 63, and a control module 64. Prior to description, the components of the device control unit 260 may be implemented as components included in a single system or as separate independent distribution server devices. That is, the collection module 61, the parser 62, the filter 63, and the like may be implemented as independent distribution server devices, and the control module 64 may centrally control the above-described distribution server devices.

The collection module 61 may include the plurality of information collectors in order to collect a large amount of POI related information. The plurality of information collectors may be connected to the POI related information providing devices 100 based on areas or certain address ranges, and collect in parallel the POI related information described in the corresponding POI related information providing devices 100. Through such parallel collection, the collection module 61 may shorten a POI related information collection time. In this process, the information collectors may determine whether the POI related information is provided from the corresponding POI related information providing device 100 based on a query provided by the control module 64. For example, the information collectors may ascertain web pages implemented in each of the POI related information providing devices 100 or specific data information, and search for web pages or web documents corresponding to the POI related information including document contents including queries transmitted from the control module 64, from corresponding information. Next, when the POI related information including certain items defined in the queries is searched, the plurality of information collectors may request for forming a communication channel of the device communication unit 210 in order to transmit the corresponding POI related information to the POI related information processing device 200.

The parser 62 may ascertain contents of a large amount of POI related information collected by the collection module 61 and parse and classify a corresponding web document into a body and a title. The plurality of information collectors included in the collection module 61 may ascertain contents of the body of the web page or the web document as well as the title of the web page or the web document in the process of collecting information, and collect and transmit the POI related information having items included in the corresponding query. Thus, in order to perform title based filtering in a process of performing filtering later, it is necessary that the POI related information is classified into titles and bodies. That is, the parser 62 may parse and classify contents of the web document into a body and a title in order to support to a title filtering function of the filter 63, and provide the parsed and classified information to the filter 63. Meanwhile, the filter 63 according to the present invention may omit title based filtering when selectively performing at least one filtering among four filtering which will be described as below, and in this case, parsing on the title and body of the POI related information of the parser 62 may not be required. Consequently, the parser 62 may be a component which can be omitted from the components of the device control unit 260 in accordance with a design policy of the POI related information processing device 200.

The filter 63 may perform filtering on the POI related information provided by the collection module 61 in accordance with predefined certain rules. In particular, when performing title based filtering, the filter 63 may receive the POI related information whose title and body are classified from the parser 62. Such a filter 63 may selectively perform at least one of address based filtering, phone number based filtering, image information based filtering, and title based filtering with respect to the POI related information in accordance with the design policy or an instruction of a device manager.

The address based filtering is a process which determines whether the number of character strings of a certain address format included in the POI related information received from the collection module 61 exceeds a predefined threshold value, and performs filtering on the POI related information in which the number of character strings exceeds the threshold value. The address format in such address based filtering may differ in accordance with an area to which the POI information is applied. For example, when performing filtering on the POI information of a domestic area, the address format may define the number of character strings in accordance with a domestic address format, and when performing filtering on the POI related information of a foreign area, the address format may define the number of character strings in accordance with a foreign address format of a specific area. The filter 63 may classify the POI related information having address information with the character strings exceeding the threshold value as non-effective information. For example, when N or more number of addresses are included in a web document corresponding to a single piece of POI related information, the filter 63 may classify the POI related information as non-effective information. The filter 63 may perform filtering on advertisement documents in which a plurality of POIs of a specific area are included in a single web document through address based filtering. In addition, the filter 63 may perform filtering on false POI related information which does not fit a domestic address system in accordance with definition of the address format.

The phone number filtering is a process which performs filtering on a case in which the number of character strings of a phone number format included in the POI related information provided by the collection module 61 exceeds a threshold value. That is, when N or more number of phone numbers are included in a web document or the like corresponding to a single piece of POI related information, the filter 63 may perform filtering on the corresponding POI related information as non-effective information. In this instance, when the phone number is a consecutive phone number, the filter 63 may determine the corresponding POI related information as effective POI related information. For example, when there is the POI related information having a large number of phone numbers whose last digits are consecutive, the filter 63 may determine the corresponding POI related information as effective POI related information.

The image information based filtering is a process which performs filtering on corresponding POI related information as non-effective information when an image does not appear in a document by reflecting the fact that at least one picture is necessarily attached to a review created directly by a reviewer. Thus, the filter 63 may support only the POI related information including at least one image to be processed as effective information. In particular, the filter 63 may perform processing on information posted by copying contents of another web document with respect to only the attached image's URL pattern.

The title based filtering is a process which creates a query based on a business name and an address of a business, and filters cases in which POI name and address do not appear in a title in order to filter unsuitable documents because a matching range corresponds to the entire documents even though exact matching is performed. That is, the filter 63 may ascertain a title portion among contents of a title and a body transmitted from the parser 62 to determine whether predefined certain items are included in the title, and support to process the corresponding POI related information as effective POI related information only when the corresponding information is included in the title.

There may be cases in which documents including posts and advertisements of malicious users are included in the collected POI related information even though keywords in which business names and area names are combined are used, and in these cases, the filter 63 may perform at least one of the four filtering methods in a selective and stepwise manner so as to filter such spam information and extracts only POI related documents. For example, the filter 63 may be designed to perform the four filtering methods such as the address based filtering, the phone number based filtering, the image information based filtering, and the title based filtering.

The control module 64 may extract business name information and address information from information described in accordance with the POI format stored in the POI database 251 to create a query. Next, the control module 64 may allocate the created query to the information collectors. Then, the collection module 61 including the information collectors may collect the POI related information including the corresponding query through meta search. The created query is supported so as to perform exact matching using AND operation between created keywords, thereby enhancing accuracy of the collected POI related information.

The control module 64 may follow a certain rule in order to create a query. That is, the control module 64 may control a query to be created in units of POI and "-dong" when the POI is included in seven metropolitan areas. For example, when a business name of "OO chueotang" and address information of "6, OO-dong, Seongbuk-gu, Seoul" are written in POI information based on the POI format, the control module 64 may create the query as "OO chueotang" and "OO-dong". In addition, when the POI is not included in the seven metropolitan areas and "-si" is included in the address information, the control module 64 may support to separately create two queries such as POI and "-si" and POI and "-dong". For example, when a business name of "OOO sundubu" and address information of "OO-dong, Paldal-gu, Suwon-si, Gyeonggi-do" are included in corresponding POI information, the control module 64 may create two queries such as "OOO sundubu" AND "Suwon" and "OOO sundubu" AND "OO-dong". Here, when "-gun" is included in the address information, the control module 64 may support to create the query as POI and "-gun". For example, when a business name of "my OO" and address information of "OO-ri, OO-myeon, Geochang-gun, Gyeongsangnam-do" are included in corresponding POI information, the control module 64 may support to create a query of "my OO" AND "Geochang".

The reason why creation of the search keyword differs depending on house numbers is to enable initial collected documents to include the fewest number of documents which are not directly associated with POI and to enable documents including exactly only the POI information to be selected. In a process in which the collection module 61 collects the POI related information, documents are collected using the query created by the control module 64.

Since an amount of web documents corresponding to the POI related information is large, there may be cases in which a large amount of documents whose accuracy is degraded, for example, a large amount of documents hardly associated with the POI are included in results obtained using the queries for searching, and thus efficiency of filtering on the documents may be degraded. That is, when a large amount of POI related information is indiscreetly collected, information having less association between the collected POI related information and the POI information may be included. In order to prevent this, the control module 64 may adjust the number (K) of documents to be secured by the collection module based on a certain routine. That is, when D denotes the number of documents to be secured for each POI, N denotes the number of documents obtained as a specific query result, K denotes the number of documents to be secured by the collection module 61, and t denotes a collection rate (0<t<1), the control module 64 may adjust the number K of documents based on a routine of If (N<D) then K=N, Else if ((N*t)>D) then K=N*t, Else if((N*t)<=D) then K=D.

For example, on an assumption that the number of documents to be secured for each POI is 100 and a collection rate is 10% (0.1), when the number of documents obtained through the specific query is 50, the number of documents obtained through the specific query is smaller than the number of documents to be secured for each POI (N<D), and therefore the control module 64 may control the collection module 61 so that 50 documents obtained through the specific query are all collected. In addition, on another assumption that the number of documents to be secured for each POI is 100 and a collection rate is 10%, when the number of documents obtained as the result of the specific query is 2,000, 2000*0.1=200 is larger than the number of documents to be secured for each POI (100), and therefore the collection module 61 may collect 200 upper level documents among the documents obtained as the result of the specific query. In addition, on another assumption that the number of documents to be secured for each POI is 100 and a collection rate is 10%, when the number of documents obtained as the result of the specific query is 200, 200*0.1 is smaller than the number of documents to be secured for each POI (100), and therefore 100 documents corresponding the number of documents to be secured by the collection module 61 may be collected. The reason why the number of collected documents corresponding to the POI related information is adjusted using such a formula is because documents which are not associated with the POI are highly likely to be collected when an amount of the documents is too large. Thus, when an amount of documents, that is, an amount of the POI related information is too large, the control module 64 may support to adjust the collection rate (t) in order to reduce the number of collected documents and to collect a minimum number (D) of documents to be secured in order to prevent too small number of documents from being collected.

Figure 4:
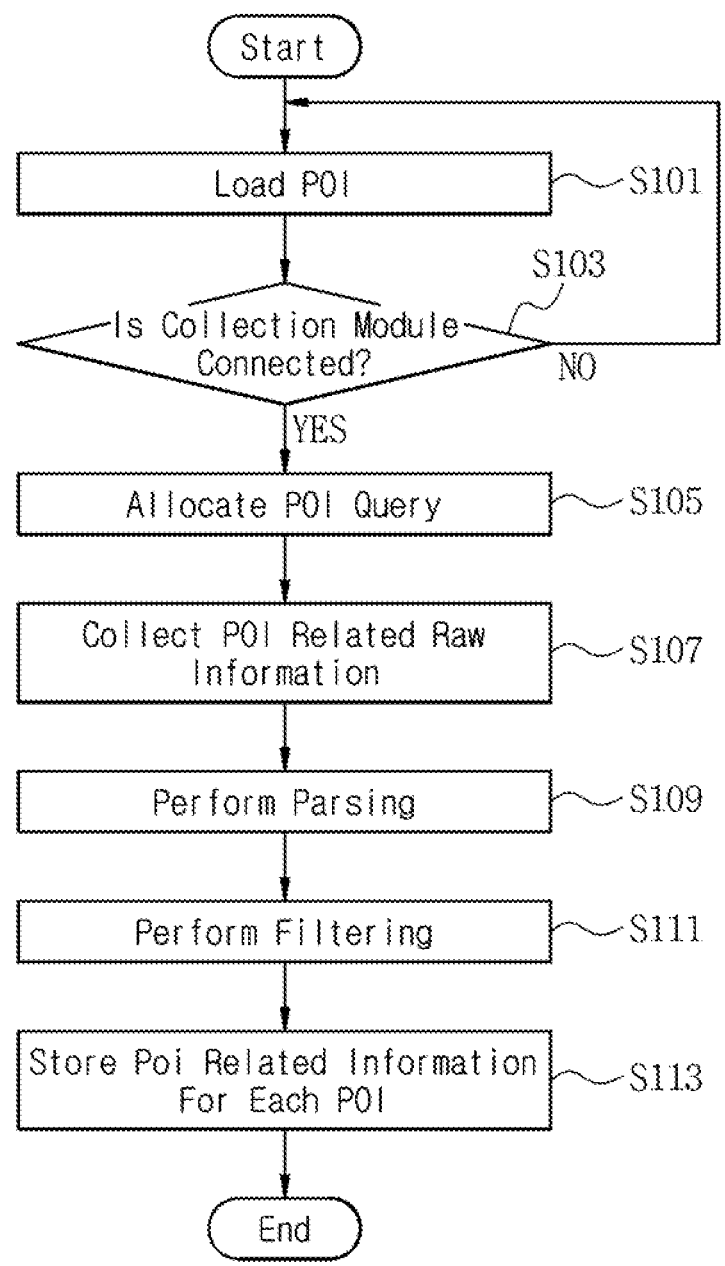
FIG. 4 is a view showing a POI related information processing method according to an embodiment of the present invention.

FIG. 4 is a view showing a POI related information processing method according to an embodiment of the present invention.

Referring to FIG. 4, in step S101, in the POI related information processing method, the device control unit 260 of the POI related information processing device 200 loads POI information included in the POI database 251 from another terminal or at least one of a specific storage device designated by a device manager, an external storage device, and the device storage unit 250. Here, the loaded POI information may be information which has a business name and address information stored in a predefined POI format. In step S103, when the POI information is loaded, the device control unit 260 may perform connection of the collection module 61 in order to collect POI related information corresponding to the loaded POI information. The collection module 61 may perform various functions such as information collection and the like, and therefore the device control unit 260 may request, from the collection module 61, connection of an available information collector in order to collect the POI related information for the loaded specific POI information among the plurality of information collectors included in the collection module 61. Here, when the collection module 61 does not perform a separate operation and is designed to be connected and waited for collecting the POI related information, step S103 may be omitted. When the connection of the collection module 61 is not completed, the device control unit 260 may be branched to a step before performing step S101, and perform the following process while waiting.

Meanwhile, when the connection of the collection module 61 is completed, the device control unit 260 may perform POI query allocation in step S105. Here, the device control unit 260 creates a POI query based on business name information and address information included in the POI information as described above. Next, the device control unit 260 may transmit the created POI query to the specific information collectors.

When the collection module 61 is allocated with the POI query by the device control unit 260, the POI related information providing device 100 having POI related information including information matching at least a part of the business name and address information included in the corresponding POI query may be searched in step S107. For this, the collection module 61 accesses the communication network 300, visits various content providing devices connected to the communication network 300, for example, blog support devices, Internet bulletin boards support devices, data support devices, and the like to search for information corresponding to the POI query in a specific web document of the corresponding content providing devices. Next, the collection module 61 may collect corresponding POI related information to transmit the collected information to the device control unit 260. In particular, the collection module 61 may transmit the corresponding information to the parser 62 in accordance of a policy of the device control unit 260.

The parser 62 divides the corresponding POI related information into a title and a body in accordance with a selective design method with respect to various processes of filtering the POI related information. When receiving the POI related information from the collection module 61, the parser 62 divides the corresponding POI related information into a title and a body in step S109. Next, the parser 62 may transmit the divided information to the filter 63.

In step S111, the filter 63 may perform at least one of the above-described four filtering methods, for example, the address information based filtering, the phone number based filtering, the image information based filtering, and the title based filtering to thereby detect the POI related information from the corresponding POI related information. In this process, the device control unit 260 may have a limitation in an appropriate number of documents based on the number of documents collected by the collection module 61 and the number of documents to be secured for each of predefined POIs. That is, when an amount of currently collected documents is small, the device control unit 260 may perform the filtering of the filter 63 in a more simple manner, or omit at least one filtering method to support the number of documents to be secured for each POI to be obtained. When an amount of documents collected by the collection module 61 is large, the device control unit 260 may complexly perform the four filtering methods to thereby enhance effectiveness and validity of the documents and support the predefined number of documents to be obtained. In this process, the device control unit 260 may selectively apply each of the filtering methods, and therefore an appropriate filtering method may be selected based on comparison between the result obtained by selectively applying each of the filtering methods and the predefined number of documents to be secured.

When the predefined number of pieces of POI related information is collected through the filtering, the device control unit 260 may support to store the collected POI related information in conjunction with each of POIs stored in the POI database 251 in step S113.

In addition, when receiving a request for connection of external another terminal and for the POI related information with respect to specific POI information, the device control unit 260 may support to transmit the POI related information collected through the above-described process to the corresponding requesting terminal.

As described above, according to the POI related information processing method and system according to the present invention, a large amount of information about POI may be obtained by searching web documents on the Internet, and the obtained information may be filtered through information such as address and phone number of the POI DB, the title of the web document, whether the image information is attached, and the like. Thus, only documents including accurate information may be extracted from a large amount of POIs.

The POI related information processing method according to various embodiments of the present invention may be implemented in the form of software readable by various computer means and recorded in a computer-readable recording medium. The computer-readable recording medium may separately include program commands, local data files, local data structures, etc. or include a combination of them. The medium may be specially designed and configured for the present invention, or known and available to those of ordinary skill in the field of computer software.

Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. Such a hardware apparatus may be configured to operate in one or more software modes, or vice versa in order to perform the operation of the present invention.

While the invention has been shown and described with reference to certain exemplary embodiments thereof, it will be understood by those skilled in the art that various changes in forms and details may be made therein without departing from the spirit and scope of the invention as defined by the appended claims.

Industrial Applicability

The present invention is related to the POI related information processing system and method and the apparatus for supporting the same. According to the present invention, more accurate POI related information may be collected and operated, thereby ensuring high reliability such as providing POI related information desired to be searched by a user.

Thus, according to the present invention, the user's desired search information may be more accurately and easily searched, and therefore the required time and efforts may be reduced, thereby supporting more competitive work performance and business promotion.

The invention claimed is:

1. A point of interest (POI) related information processing system, comprising:
    at least one POI related information providing device configured to provide POI related information including business name information and at least a part of address information; and
    a POI related information processing device configured to
        create a query based on business name information of at least one piece of POI information and at least a part of address information of the at least one piece of POI information,
        collect the POI related information associated with corresponding POI information based on a corresponding query from the at least one POI related information providing device,
        collect a predefined amount of the POI related information by performing at least one filtering in accordance with a predefined rule, and then
        store and operate the collected information in conjunction with the POI information,
    wherein the POI related information processing device is further configured to omit a part of the at least one filtering when the number of documents about the POI related information is smaller than the number of documents to be secured, or
    wherein the POI related information processing device is further configured to adjust an amount of the POI related information by complexly performing the at least one filtering when the number of documents about the POI related information is greater than the number of documents to be secured.

2. A POI related information processing device, comprising:
    a device communication unit configured to form a communication channel for collecting POI related information through a communication network; and
    a device control unit configured to
        create a query based on business name information of at least one piece of POI information and at least a part of address information of the at least one piece of POI information,
        collect the POI related information associated with corresponding POI information based on a corresponding query, and
        collect a predefined amount of the POI related information by performing at least one filtering in accordance with a predefined rule,
    wherein the device control unit is further configured to omit a part of the at least one filtering when the number of documents about the POI related information is smaller than the number of documents to be secured, or wherein the device control unit is further configured to adjust an amount of the POI related information by complexly performing the at least one filtering when the number of documents about the POI related information is greater than the number of documents to be secure.

3. The POI related information processing device of claim 2, further comprising:
a device storage unit configured to store the POI information and the POI related information stored in conjunction with the POI information.

4. The POI related information processing device of claim 2, wherein the device control unit comprises:
a collection module comprising a plurality of information collectors for collecting the POI related information based on the query; and
a filter configured to perform filtering on the POI related information collected by the collection module in accordance with the predefined rule.

5. The POI related information processing device of claim 4, the device control unit further comprises:
a parser configured to divide and classify the POI related information transmitted from the collection module into a title and a body.

6. The POI related information processing device of claim 4, wherein the filter is further configured to perform at least one filtering selected from the group consisting of
address information based filtering for performing filtering on the POI related information based on the address information in accordance with the predefined rule,
phone number based filtering for performing filtering on the POI related information by excluding information including a predefined phone number,
image information based filtering for performing filtering in accordance with whether image information is included in the POI related information, and
title based filtering for performing filtering in accordance with whether predefined information of a title and a body of the POI related information is included in the title.

7. The POI related information processing device of claim 2, wherein the device control unit is further configured to create at least one query based on the business name information of the POI and -si, -gun, and -dong information of the at least a part of the address information, and allocate the created query to the collection module.

8. A POI related information processing method, comprising:
creating a query based on at least a part of business name information and address information from POI information;
collecting POI related information including the created query from a content providing device;
performing at least one filtering for collecting the POI related information by performing filtering on the collected POI related information in accordance with a predefined rule; and
storing the filtered POI related information in conjunction with the POI information,
wherein the performing the at least one filtering comprises:
omitting a part of the at least one filtering when the number of documents about the POI related information is smaller than the number of documents to be secured, or
adjusting an amount of the POI related information by complexly performing the at least one filtering when the number of documents about the POI related information is greater than the number of documents to be secure.

9. The POI related information processing method of claim 8, wherein the the at least one filtering is selected from the group consisting of:
address information based filtering on the POI related information based on address information in accordance with a predefined rule;
phone number based filtering on the POI related information by excluding information including a predefined phone number;
image information based filtering in accordance with whether image information is included in the POI related information; and
title based filtering in accordance with whether predefined information of a title and a body of the POI related information is included in the title.

10. The POI related information processing method of claim 9, further comprising adjusting the number of documents to be secured for each POI by performing the at least one filtering on the number of documents collected by the collection module.

11. A computer readable recording medium in which a program for executing the method described in claim 8 is recorded.

* * * * *